Sept. 12, 1933.　　　　　I. S. KEELER　　　　　1,926,102

CATCH FOR AUTOMOBILE HOODS AND LIKE CLOSURES

Filed Oct. 10, 1932　　　2 Sheets-Sheet 1

INVENTOR
Isaac S. Keeler
BY Chappell Earl
ATTORNEYS

Sept. 12, 1933.  I. S. KEELER  1,926,102
CATCH FOR AUTOMOBILE HOODS AND LIKE CLOSURES
Filed Oct. 10, 1932  2 Sheets-Sheet 2

INVENTOR
Isaac S. Keeler
BY Chappell & Earl
ATTORNEYS

Patented Sept. 12, 1933

1,926,102

UNITED STATES PATENT OFFICE 1,926,102

CATCH FOR AUTOMOBILE HOODS AND LIKE CLOSURES

Isaac S. Keeler, Grand Rapids, Mich., assignor to Keeler Brass Company, Grand Rapids, Mich.

Application October 10, 1932. Serial No. 637,013

11 Claims. (Cl. 292—120)

The main objects of this invention are:

First, to provide an improved catch for automobile hoods and the like.

Second, to provide a device of this character wherein rattling of the parts is substantially eliminated.

Third, to provide a hood catch which is simple and economical in its parts and efficient and effective in operation.

Objects relating to details and economies of my invention will appear from the description to follow. The invention is defined and pointed out in the claims.

A structure which is a preferred embodiment of my invention is illustrated in the accompanying drawings, in which.

Figure 1:
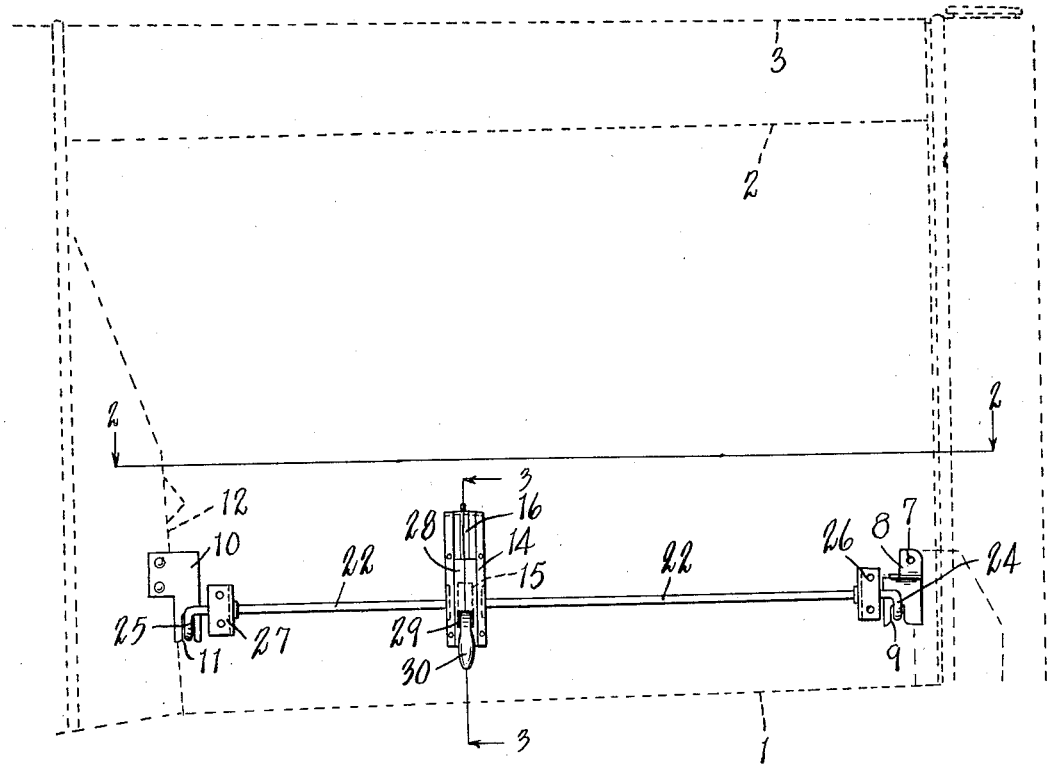
Fig. 1 is a view in side elevation of a hood catch embodying the features of my invention, parts of an automotive vehicle being shown by dotted lines.

In the embodiment of my invention illustrated, 1 represents one of the members of a hood; 2 and 3 retaining hinges thereof. 4 and 5 are fixed hood coacting parts of the vehicle. A front keeper 6 is bolted to the front abutment at 7, the keeper having an integral supporting arm 8 and being provided with a downwardly facing V-shaped or flared latch receiving recess 9. The rear keeper 10 has a similar downwardly facing latch receiving recess 11 and is secured to the body bracket 12.

The hood is provided with a vertical slot 13 adapted to receive a latch handle. Secured to the inner side of the hood is a bracket 14 having a slot 15 aligned with the slot 13 of the hood. This bracket has inwardly offset opposed vertical slideways 16 and is provided at its upper end with an inturned inwardly projecting lug 17 having a hole 18 therein. The bracket is provided with inwardly projecting ears 20 having downwardly facing pivot or bearing recesses 21.

Figure 2:
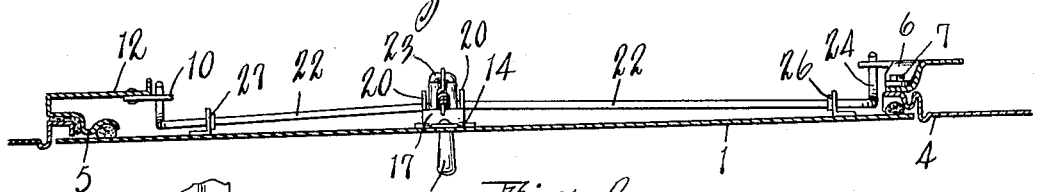
Fig. 2 is a horizontal section on a line corresponding to line 2—2 of Fig. 1, the parts of the vehicle being shown in full lines.
Figure 6:
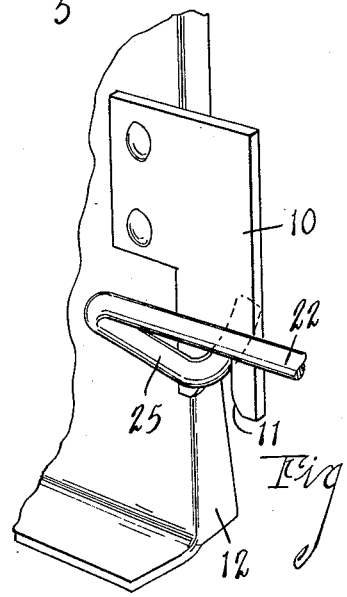
Fig. 6 is a fragmentary perspective view of the rear keeper.
Figure 7:
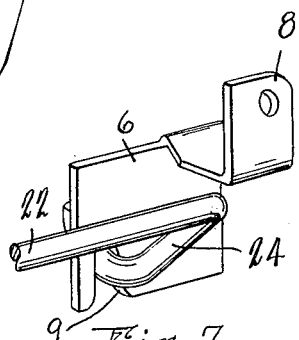
Fig. 7 is a view similar to Fig. 6, of the front keeper.
Figure 3:
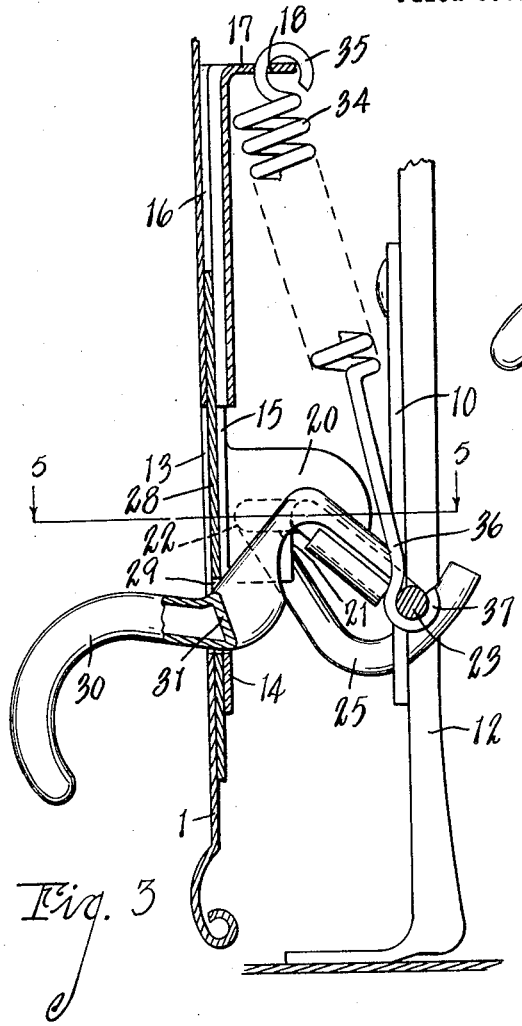
Fig. 3 is a fragmentary vertical section on a line corresponding to line 3—3 of Figs. 1 and 5, showing the parts in latched position.

A rockshaft 22 is journaled in these ears and is provided with a crank-like offset providing an arm 23 which is disposed between the ears. At its ends the rockshaft has hook-like latches 24 and 25 which coact with the front and rear keepers. The rockshaft is preferably formed of a rod of spring or resilient material. Its outer ends are supported by the pivot ears or bearing members 26 and 27 which are so arranged relative to the pivot ears of the bracket as to bow the rockshaft as illustrated in Fig. 2 and thereby place it under spring stress preventing its rattling in its bearings.

A closure slide 28 is provided for the handle opening 13 in the hood, this being in the form of a flat plate reciprocatingly mounted in the ways of the bracket and having an opening 29 through which the handle 30 extends, the opening being of such size that the handle can pivot and has a limited longitudinal movement relative to the closure slide.

The handle is preferably formed of sheet metal and forked at its inner end 31, the arms of the handle being folded over the arms of the offsets so as to embrace and grip the same thereby securing the handle to the rockshaft so that the rockshaft is rocked by swinging the handle.

The tension spring 34 has a hook 35 at its upper end engaged in the hole 18 of the lug 17 of the bracket and has an arm-like extension 36 at its lower end terminating in a hook 37 engaged with the bight portion of the offset so that the spring acts to urge the pivot portions of the rockshaft into the pivot recesses of the ears 20 and also urge the latches on the rockshaft into engagement with the keepers. These latches, it will be noted, engage the keepers with an inward and upward swinging movement and acting under the yielding tension of the spring yieldingly urge the closure against the abutment.

Figure 4:
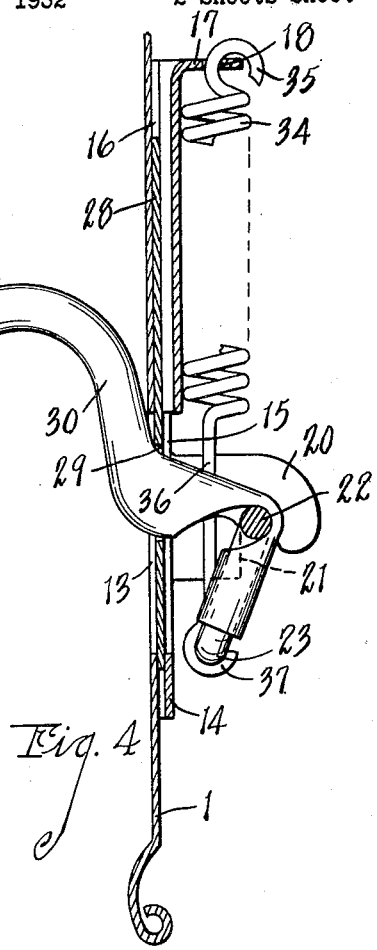
Fig. 4 is a view similar to Fig. 3, showing the parts in unlatched position.
Figure 5:
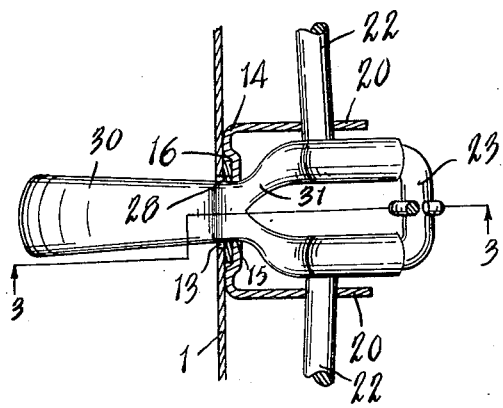
Fig. 5 is a fragmentary horizontal section on line 5—5 of Fig. 3.

When the handle is raised to the position indicated in Fig. 4, the bight portion of the spring crank arm is swung to the inside of the pivot of the rockshaft; that is, it swings across the vertical plane of the pivot so that the spring acts to yieldingly hold the latches in retracted position and an upward pull on the handle not only disengages the latches but the latch handle serves as a handle for the hood.

The handle has a curved portion which engages the opening through the slide 16, this curved portion allowing for the swinging of the handle in the slide opening and also providing a relatively close fit and preventing wedging or clutching action between the closure slide and handle.

From the above description of my invention, it will be apparent to those skilled in the art that I provide an inside hood catch which is extremely simple and economical in its parts and efficient and effective in operation. With the exception of the handle, the parts of the clutch are all concealed within the hood of the vehicle, which improves the appearance thereof. The arrangement of the parts is such that rattling is eliminated, which is a decided advantage in a device of this character.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a catch for automobile hoods and like swingingly supported closures, the combination of a bracket mounted on the inner side of the closure and having an inwardly projecting lug at its upper end and inwardly projecting spaced pivot ears provided with downwardly facing pivot recesses, said bracket also having a vertical slideway and a slot between its said pivot ears, the closure having a handle opening aligned with the slot of said bracket, a rockshaft journaled in said pivot recesses of said ears and having a crank offset between the ears and laterally disposed hook-like latches at its ends, end bearing members for said rockshaft mounted on the inner side of the closure adjacent said latches and coacting with said pivot ears to hold said rockshaft under spring tension, a tension spring secured at its lower end to the bight of said offset and at its upper end to said lug on said bracket, a handle disposed through said opening in said hood and forked at its inner end to engage the arms of said offset, the arms of said handle being clamped upon the arms of the offset, and a closure slide for said handle opening slidable in said slideway of said bracket and having an opening through which the handle projects.

2. In a catch for automobile hoods and like swingingly supported closures, the combination of a bracket mounted on the inner side of the closure and having an inwardly projecting lug at its upper end and inwardly projecting spaced pivot ears provided with downwardly facing pivot recesses, said bracket also having a slot between its said pivot ears, the closure having a handle opening aligned with the slot of said bracket, a rockshaft journaled in said pivot recesses of said ears and having a crank offset between the ears and laterally disposed hook-like latches at its ends, end bearing members for said rockshaft mounted on the inner side of the closure adjacent said latches and coacting with said pivot ears to hold said rockshaft under spring tension, a tension spring secured at its lower end to the bight of said offset and at its upper end to said lug on said bracket, and a handle disposed through said opening in said hood and forked at its inner end to engage the arms of said offset, the arms of said handle being clamped upon the arms of the offset.

3. In a catch for automobile hoods and like closures, the combination of a bracket mounted on the inner side of the closure and having spaced pivot ears, said bracket also having a vertical slideway and a slot between its said pivot ears, the closure having a handle opening aligned with the slot of said bracket, a rockshaft journaled in said pivot recesses of said ears and having a crank offset between the ears and laterally disposed hook-like latches at its ends, end bearing members for said rockshaft mounted on the inner side of the closure adjacent said latches, a tension spring secured at its lower end to the said offset and at its upper end to said bracket, a handle disposed through said opening in said hood and engaging said offset, the arms of said handle being clamped upon the arms of the offset, and a closure slide for said handle opening slidable in said slideway of said bracket and having an opening through which the handle projects.

4. In a catch for automobile hoods and like closures, the combination of a bracket mounted on the inner side of the closure and having spaced pivot ears, said bracket also having a slot between its said pivot ears, the closure having a handle opening aligned with the slot of said bracket, a rockshaft journaled in said pivot recesses of said ears and having a crank offset between the ears and laterally disposed hook-like latches at its ends, end bearing members for said rockshaft mounted on the inner side of the closure adjacent said latches, a tension spring secured at its lower end to the said offset and at its upper end to said bracket, and a handle disposed through said opening in said hood and engaging said offset, the arms of said handle being clamped upon the arms of the offset.

5. In a catch for automobile hoods and like closures, the combination of a bracket mounted on the inner side of the closure and having spaced pivot ears provided with downwardly facing pivot recesses, said bracket and closure having aligned handle openings, a rockshaft journaled in said pivot recesses of said ears and having a crank-like offset between said pivot ears and laterally disposed hook-like latches, end bearing members for said rockshaft disposed adjacent the latches and coacting with said pivot ears to hold said rockshaft under spring tension, a tension spring connected at its upper end to said bracket and to the said crank so that the spring acts to urge the latches into keeper engaging position or to hold them in retracted position, a handle disposed through said openings in said hood and bracket and secured to said offset, and a closure for said handle opening slidable on said bracket and operatively engaged with said handle.

6. In a catch for automobile hoods and like closures, the combination of a bracket mounted on the inner side of the closure and having spaced pivot ears, a rockshaft journaled in said ears and having a crank-like offset between said pivot ears and laterally disposed hook-like latches, end bearing members for said rockshaft disposed adjacent the latches and coacting with said pivot ears to hold said rockshaft under spring tension, a tension spring connected at its upper end to said bracket and to the said crank so that the spring acts to urge the latches into keeper engaging position or to hold them in retracted position, and a handle disposed through said openings in said hood and bracket and secured to said offset.

7. In a catch for automobile hoods and like closures, the combination of a bracket mounted on the inner side of the closure and having spaced pivot ears provided with downwardly facing pivot recesses, said bracket and closure having aligned handle openings, a rockshaft journaled in said pivot recesses of said ears and having a crank-like offset between said pivot ears and laterally disposed hook-like latches, end bearing members for said rockshaft disposed adjacent the latches, a tension spring connected at its upper end to said bracket and to the said crank, a handle disposed through said openings in said hood and bracket and secured to said offset, and a closure for said handle opening slidable on said bracket and operatively engaged with said handle.

8. In a catch for automobile hoods and like closures, the combination of a bracket mounted on the inner side of the closure and having spaced pivot ears, a rock-shaft journaled in said ears and having a crank-like offset between said pivot ears and laterally disposed hook-like latches, end bearing members for said rockshaft disposed adjacent the latches, a tension spring connected at its upper end to said bracket and at its lower end to the said crank-like offset, and a handle disposed through said openings in said hood and bracket and secured to said offset.

9. In a catch for automobile hoods and like closures, the combination of a rockshaft pivotally mounted on the inner side of the closure and having an offset providing an arm and provided with hook-like latches, there being pivotal supports for said rockshaft adjacent said arm and adjacent the said latches, a spring connected to said arm and to said hood and acting to urge the latches to keeper engaging position, a handle disposed through said hood and secured to said arm, said hood having an opening permitting the swinging of said handle, and a closure slidably supported on the inner side of the hood and operatively engaged with said handle.

10. A catch for automobile hoods and like closures comprising a bracket mounted on the inner side of the closure and having spaced pivot ears provided with downwardly facing pivot recesses, a rockshaft journaled in said pivot recesses of said ears and having a crank-like offset between said pivot ears providing an arm and having laterally disposed keeper engaging latches, a spring connected at one end to said bracket and to the bight of said offset which swings across the vertical plane of the pivot of the rockshaft so that the spring acts to urge the latches into keeper engaging position or to hold them in retracted position, and a handle disposed through an opening in said hood forked at its inner end to engage the arms of said offset to which it is secured.

11. A catch for automobile hoods and like closures comprising a bracket mounted on the inner side of the closure, a rockshaft journaled on said bracket and having a crank-like offset providing an arm and having laterally disposed keeper engaging latches, a spring connected at one end to said bracket and at the other end to the bight of said offset, and a handle disposed through an opening in said hood forked at its inner end to engage the arms of said offset to which it is secured.

ISAAC S. KEELER.